UNITED STATES PATENT OFFICE.

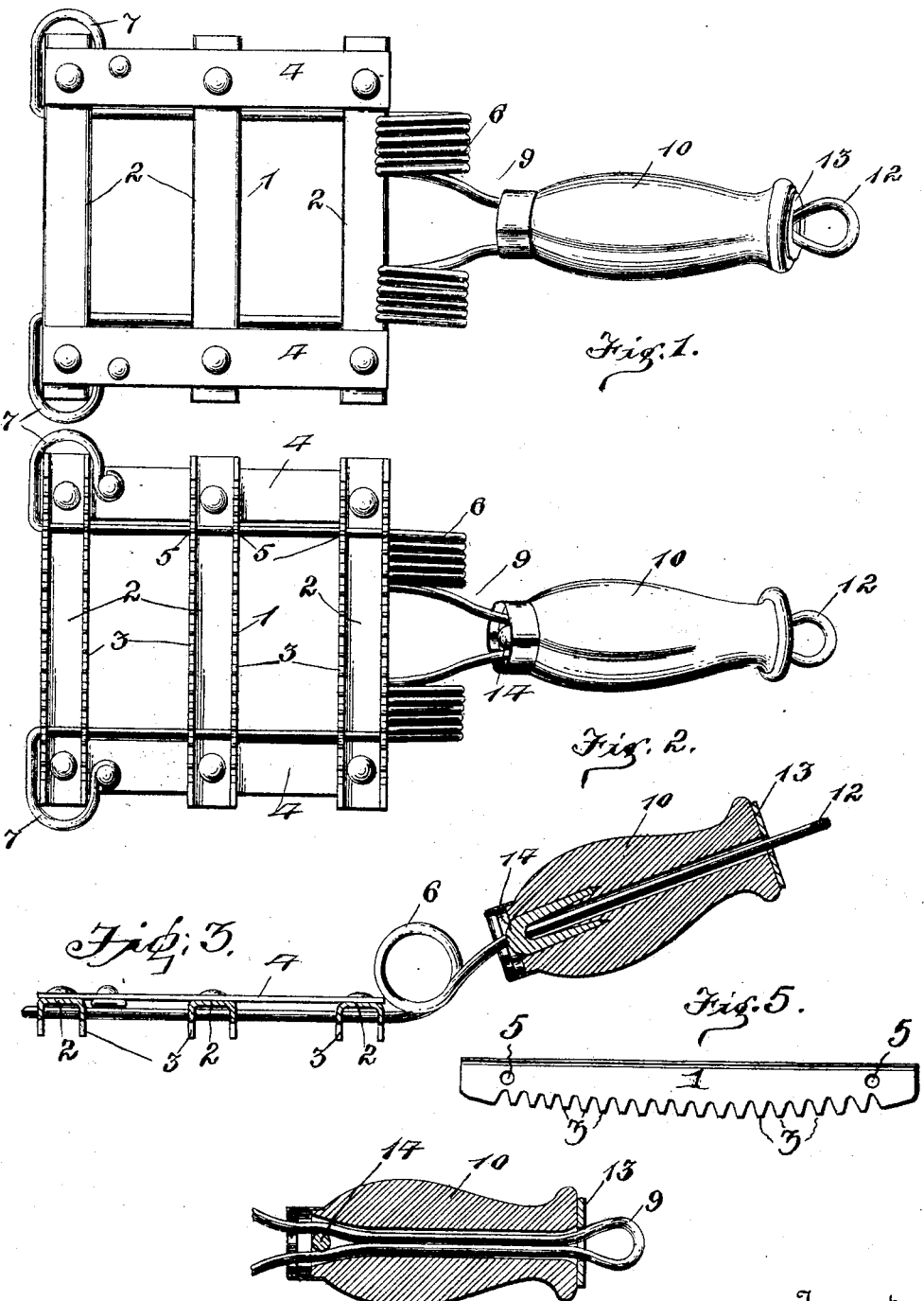

MATHEW ALSTON, OF HAMILTON, ILLINOIS.

CURRYCOMB.

No. 803,321. Specification of Letters Patent. Patented Oct. 31, 1905.

Application filed February 16, 1905. Serial No. 245,923.

*To all whom it may concern:*

Be it known that I, MATHEW ALSTON, a citizen of the United States, residing at Hamilton, in the county of Hancock and State of Illinois, have invented certain new and useful Improvements in Currycombs; and I do declare the following to be a full, clear, and exact description of the invention, such as will enable others skilled in the art to which it appertains to make and use the same.

This invention relates to improvements in currycombs.

The object of the invention is to provide a currycomb which will be flexible and yielding when used, thus making the same more comfortable to the animal, the flexible and yielding construction of the comb also making the same easier to use, as a great deal of strain is relieved from the hand of the operator by the spring connection of the handle to the comb.

A further object is to provide a comb of this character which will be simple, strong, and durable in construction, easily cleaned, efficient in use, and well adapted to the purpose for which it is designed.

With these and other objects in view the invention consists of certain novel features of construction, combination, and arrangement of parts, as will be hereinafter described and claimed.

In the accompanying drawings, Figure 1 is a top plan view of a currycomb constructed in accordance with the invention. Fig. 2 is a bottom plan view of the same. Fig. 3 is a central longitudinal vertical sectional view; and Fig. 4 is a horizontal sectional view through the handle of the comb, showing the manner of connecting the same. Fig. 5 is a detail elevation of one of the channel-bars.

Referring more particularly to the drawings, 1 denotes the body of the comb, which may be of any suitable construction, but which is preferably formed of a series of channel-iron bars, the lower edges of which are formed on a slight upward curve from the center to the outer ends of the same. Said lower curved edges are serrated or provided with teeth 3. The bars 2 are spaced apart at suitable intervals and secured on their upper or back sides to longitudinally-disposed spacing-bars 4 by means of rivets or other suitable connections. To the sides of the channel-bars, near each end of the same, are formed alined apertures 5, through which are adapted to be inserted the ends of a spring-wire connection 6 for the handle. The free ends of this wire connection 6 after passing through the outer tooth-bar are bent laterally and around the ends of said bar to form knockers 7, the ends of the wire being formed into an eye and riveted or otherwise secured to the connecting-bars 4, as shown.

The spring-wire connection 6 at the inner side of the comb-body 1 is formed into spring-coils and from thence projects in the form of a loop 9, which is adapted to be inserted through a suitable handle 10 and to project beyond the end of the same to form an eye 12, by which said comb may be hung up. On the bars of the loop 9, between the eye 12 and the adjacent end of the handle, is arranged a disk or plate 13, in which is formed an elongated aperture of such size as to closely engage the bars of the loop and to hold the same together. In applying the handle to the loop 9 of the connection 6 said looped end is inserted through an aperture in the handle and through the elongated aperture in the plate 13, after which the projecting end of the loop is opened or spread to form the eye 12. This opening of the eye will spread the bars of the loop, thus binding the plate 13 against the free end of the handle, which will securely hold the same in place. In the opposite end of the handle, between the wire bars forming the loop, is driven a wedge or key 14, which serves as an additional means for rigidly connecting the handle with the bars of the spring connection.

A currycomb constructed as herein shown and described will be found to possess many advantages over the common form of comb and may be manufactured at less cost than many forms of comb now in use.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a device of the character described, the combination with the comb-body of a handle, a spring connection between said comb and said handle and knockers formed by a continuation of said spring connection, substantially as described.

2. In a device of the character described, the combination with the comb-body of a handle, a coiled-spring connection between said handle and said comb-body, knockers formed by a continuation of the coiled-spring connection, and means whereby said handle is secured to said coiled-spring connection, substantially as described.

3. In a device of the character described, the combination with the comb-body comprising a series of channel-iron tooth-bars spaced apart and secured together, of a handle, a spring-wire connection between said handle and said comb-body, said connection comprising a single spring-wire bar bent upon itself to form a handle-engaging portion, a pair of spring connecting-coils, comb-securing bars, and knockers formed on said bars, substantially as described.

4. In a device of the character described, the combination with the comb-body comprising a series of channel-iron tooth-bars spaced apart and secured together, of a handle, a spring-wire connection between said handle and said comb-body, said connection comprising a single spring-wire bar bent upon itself to form a handle-engaging portion having a loop or eye forming a hanger, a pair of spring connecting-coils, comb-securing bars bent to form knockers, an apertured securing-plate arranged on said handle-engaging portion and a securing-wedge arranged in the opposite end of said handle, substantially as described.

In testimony whereof I have hereunto set my hand in presence of two subscribing witnesses.

MATHEW ALSTON.

Witnesses:
R. R. WALLACE,
H. M. CUERDEN.